(12) United States Patent
Gregorius et al.

(10) Patent No.: US 9,212,271 B2
(45) Date of Patent: Dec. 15, 2015

(54) PREPARATION OF MOLECULAR IMPRINTED POLYMERS BY CROSS-LINKING

(75) Inventors: Klaus Gregorius, Soborg (DK); Ian Alan Nicholls, Kalmar (SE); Nicolas Otto Krogh, Virum (DK)

(73) Assignee: Mipsalus APS, Virum (DK)

( * ) Notice: Subject to any disclaimer, the term of this patent is extended or adjusted under 35 U.S.C. 154(b) by 0 days.

(21) Appl. No.: 14/379,913

(22) PCT Filed: Feb. 28, 2012

(86) PCT No.: PCT/EP2012/053332
§ 371 (c)(1),
(2), (4) Date: Aug. 20, 2014

(87) PCT Pub. No.: WO2013/127433
PCT Pub. Date: Sep. 6, 2013

(65) Prior Publication Data
US 2015/0031779 A1 Jan. 29, 2015

(51) Int. Cl.
C08G 6/00 (2006.01)
C08J 9/36 (2006.01)
B01D 15/38 (2006.01)
B01J 20/26 (2006.01)
B01J 20/285 (2006.01)
B01J 20/30 (2006.01)
B82Y 30/00 (2011.01)

(52) U.S. Cl.
CPC .............. *C08J 9/36* (2013.01); *B01D 15/3804* (2013.01); *B01J 20/268* (2013.01); *B01J 20/285* (2013.01); *B01J 20/3007* (2013.01); *B01J 20/3057* (2013.01); *B01J 20/3085* (2013.01); *B01D 15/3852* (2013.01); *B01J 2220/82* (2013.01); *B82Y 30/00* (2013.01); *C08J 2300/00* (2013.01)

(58) Field of Classification Search
CPC .............................. C08J 9/36; C08J 2300/00
USPC ............................ 521/53; 436/501; 528/480
See application file for complete search history.

(56) References Cited

U.S. PATENT DOCUMENTS

| | | | |
|---|---|---|---|
| 4,111,863 A | 9/1978 | Wulff et al. | |
| 5,110,833 A | 5/1992 | Mosbach | |
| 5,994,110 A | 11/1999 | Mosbach et al. | |
| 6,638,498 B2 | 10/2003 | Green et al. | |
| 6,881,804 B1 | 4/2005 | Sellergren et al. | |
| 2002/0198349 A1* | 12/2002 | Norton .......................... | 526/319 |
| 2004/0157209 A1 | 8/2004 | Yilmaz et al. | |
| 2009/0194481 A1 | 8/2009 | Yilmaz et al. | |

FOREIGN PATENT DOCUMENTS

WO WO 2007/095949 A2 8/2007
WO WO 2011/033021 A2 3/2011

OTHER PUBLICATIONS

Cong, Yu, "Molecular Recognition Studies Based on Imprinting Technology", Ph.D. Thesis, 1998, 43 pages, Lund University, Sweden.

Dickey, Frank H., "The Preparation of Specific Absorbents", Proceedings of the National Academy of Sciences, May 15, 1949, pp. 227-229, vol. 35, No. 5, United States National Academy of Sciences, USA.

Funke, W., et al., "Microgels—Intramolecularly Crosslinked Marcromolecules with a Globular Structure", Advances in Polymer Science, 1998, pp. 139-234, vol. 136, Springer-Verlag, Germany.

Guerreiro, A. R., et al., "Selection of Imprinted Nanoparticles by Affinity Chromatography", Biosensors and Bioelectronics, 2009, pp. 2740-2743, vol. 24, Elsevier B.V., The Netherlands.

Hoshino, Yu, et al., "Peptide Imprinted Polymer Nanoparticles: A Plastic Antibody", Journal of the American Chemical Society, 2008, pp. 15242-15243, vol. 130, No. 46, American Chemical Society, USA.

Hosino, Yu, et al., "Recognition, Neutralization, and Clearance of Target Peptides in the Bloodstream of Living Mice by Molecularly Imprinted Polymer Nanoparticles: A Plastic Antibody," Journal of American Chemical Society, 2010, pp. 6644-6645, vol. 132, No. 19, American Chemical Society, USA.

Piletsky, S.A., et al., "Synthesis of Biologically Active Molecules by Imprinting Polymerisation", Biopolymers and Cell, 2006, pp. 63-67, vol. 22, No. 1, National Academy of Sciences of Ukraine and the Institute of Molecular Biology and Genetics of the NAS of Ukraine, Ukraine.

Poma, Alessandro, et al., "Advances in the Manufacture of MIP Nanoparticles", Trends in Biotechnology, Dec. 2010, pp. 629-637, vol. 28, No. 12, Elsevier Ltd., UK.

Ramström, Olof, et al., "Chiral Recognition in Adrenergic Receptor Binding Mimics Prepared by Molecular Imprinting", Journal of Molecular Recognition, 1996, pp. 691-696, vol. 9, John Wiley & Sons, Ltd., UK.

(Continued)

Primary Examiner — Terressa Boykin
(74) Attorney, Agent, or Firm — Alston & Bird LLP

(57) ABSTRACT

Provided is an improved method for preparation of insoluble molecular imprinted polymers (MIPs), the method comprising: a) providing soluble or semi-soluble MIPs that 1) substantially all bind template agents and 2) have sizes which enable their separation in a chromatographic step utilizing packed bed chromatography, b) cross-linking the template agent binding soluble MIPs provided in step a so as to obtain insoluble template agent binding MIPs, and c) optionally isolating, concentrating or purifying the MIPs obtained by the cross-linking in step b. In an interesting embodiment, step a includes an affinity purification procedure, which ensures that the MIPs provided in step a are indeed all binders of the template.

15 Claims, No Drawings

(56) References Cited

OTHER PUBLICATIONS

Schweitz, Leif, "Molecular Imprinted Matrices for Electrochromatography", Ph.D. Thesis, 2001, 46 pages, Lund University, Sweden.

Schweitz, Leif, et al., "Capillary Electrochromatography with Molecular Imprinted-Based Selectivity for Enantiomer Separation of Local Anaesthetics", *Journal of Chromatography A*, 1997, pp. 401-409, vol. 792, Elsevier B.V., The Netherlands.

Shea, K. J., et al., "Molecular Recognition on Synthetic Amorphous Surfaces. The Influence of Functional Group Positioning on the Effectiveness of Molecular Recognition", Journal of American Chemical Society, 1986, pp. 1091-1093, vol. 108, American Chemical Society, USA.

Shea, K. J., et al., "Synthesis and Characterization of Highly Cross-Linked Polyacrylamides and Polymethacrylamides. A New Class of Macroporous Polyamides", *Macromolecules*, Oct. 15, 1990, pp. 4497-4507, vol. 23, No. 21, American Chemical Society, USA.

Vlatakis, George, et al., "Drug Assay Using Antibody Mimics Made by Molecular Imprinting", *Nature*, Feb. 18, 1993, pp. 645-647, vol. 361, Nature Publishing Group, UK.

Wärnmark-Surugiu, Ioana, "Antibodies and Antibody Mimics in Binding Assays", Ph.D. Thesis, 2002, 27 pages, Lund University, Sweden.

Wulff, Günter, et al., "Enzyme-analogue Built Polymers, 23, Influence of the Structure of the Binding Sites on the Selectivity for Racemic Resolution", *Makromolekulare Chemie-Macromolecular Chemistry and Physics*, 1987, pp. 741-748, vol. 188, Hüthig & Wepf Verlag, Basel, Germany.

\* cited by examiner

PREPARATION OF MOLECULAR IMPRINTED POLYMERS BY CROSS-LINKING

CROSS-REFERENCE TO RELATED APPLICATIONS

This application is the U.S. National Stage of International Application PCT/EP2012/053332 filed Feb. 28, 2012, which designates the U.S and was published by the International Bureau in English on Sep. 6, 2013, which is hereby incorporated by reference in its entirety.

FIELD OF THE INVENTION

The present invention relates to preparation of molecular imprinted polymers (MIPs) that have high binding capacity and specificity. In particular, the method of the invention provides for a method of preparing composition of insoluble (i.e. high molecular weight) MIPs which all are binders of a particular target agent. The invention also relates to methods of preparing articles composed of insoluble MIPs, where said articles can have virtually any desired shape or structure.

BACKGROUND OF THE INVENTION

Molecular imprinting of synthetic polymers is a process where functional and cross-linking agents (typically monomers) capable of polymerizing are copolymerized in the presence of a target molecule, which acts as a molecular template. Before polymerization, the functional monomers either form a complex with the template via non-covalent interactions, or are covalently coupled forming a polymerizable derivative of the template. After polymerization, the functional groups of the monomers are held in position by the highly cross-linked polymeric structure. Subsequent removal of the template by solvent extraction and/or chemical cleavage reveals binding sites that are complementary in size and shape to the target molecule. In this way, a molecular memory is introduced in the polymer (now termed a "molecular imprinted polymer" or "MIP"), which is now capable of rebinding the target with very high specificity.

Originally, MIPs were employed as stationary phases in HPLC, notably for chiral separation. Subsequently, their use has been extended to other analytical techniques such as thin layer chromatography, capillary electrophoresis, solid-phase extraction, and immunoassay type binding assays. The binding sites often have affinities and selectivities approaching those of antibody-antigen systems. These mimics display some clear advantages over antibodies for sensor technology. Because of their highly cross-linked nature, MIPs are intrinsically stable and robust, facilitating their application in extreme environments, such as in the presence of acids, bases, or metal ions, in organic solvents, or at high temperatures and pressures. Moreover, MIPs are relatively inexpensive to produce and can be stored in a dry state at room temperature for long periods of time.

Hence, in principle all MIPs are made in the following way: Monomers (or polymerizable agents) and target (or template) molecules are mixed, self assembly occurs, cross binder is added and polymerization can be initiated. After polymerization the polymer is typically (but not always, cf. below) broken down into small fractions and the target molecule is extracted. If the MIPs are put into a solution of target molecules these will rebind to the MIPs (cf. also: Yu Cong; Leif Schweitz; and Ioana Wärnmark-Surugiu).

History of MIPs

One of the first examples of MIP preparation was described as early as in 1949 (Dickey) who used a kind of silica (water glass) for selective recognition of dyes. Much later other kinds of self-organizing systems to build up networks wherein it was possible to bind targets/analytes specifically were described (Ramström et al., Schweitz et al., and Vlatakis et al.)

Choice of Monomers and Polymerization

In the 1970s and 1980s (cf. Shea 1986, Shea 1990 and Wulff 1987) the concept of covalently binding the template/target molecule directly to the polymer used for building the scaffold was described. The claim was that the direct binding would lead to a more homogeneous distribution of binding sites throughout the polymer. However, at the same time this leaves the problem of removing the template after the polymerization. In order to remove the template both a micronization of the polymer and a chemical bond breaking is needed.

Preparing MIPs without tethering the template to one of the monomers used during polymerization often results in good MIPs but the experience in literature is that a lot of the MIPs particles will contain binding sites that tend to bind the template/analyte in less specific parts of the molecule and hence not giving the desired specificity of the resulting MIPs. This is very important for MIPs used for analytical purposes especially if the object is to separate stereoisomeric forms of molecules, whereas this is less important in the case where the main objective is to enhance the total binding capacity of the resulting MIPs.

In certain analytical situations it has been proven that the template has to be of a different identity i.e. instead of using the actual template the produced MIPs are build over template "mimics" in order not to pollute the sample to be analyzed. It is clear that identification of a template mimic that is capable of ensuring a specific binding between the analyte and MIP can constitute a difficult task.

A completely different method of preparing MIPs is by polymerizing the mixture while the monomer, cross binders and template (or template mimics) are kept in particulate format in an emulsion hence leaving the resultant MIP as a particle directly (Funke et al.). The particle size of MIP made with this process will depend on, amongst other things, the monomer concentration and the stirring rate (determining the droplet size in the emulsion). (In order to get particle sizes down to 1 µm one needs to stir the solution at more than 1000 rpm). According to literature the disadvantages with this type of processes are long preparation times and low yields.

In general, the prior art often describes the difficulties of preparing reproducible MIPs where both the capacity and the specificity is not compromised (hence lower than desired).

U.S. Pat. No. 4,111,863 describes "A non-swellable three-dimensional polymer having a component which is a residue of an optically active compound, which residue is chemically removable from said polymer to leave behind in the physical structure of said polymer a void corresponding to the size and shape of said residue of optically active compound, and a particular steric arrangement of functional groups within the void of said polymer corresponding to the chemical structure of said residue of optically active compound . . . ." The "optically active compound" being the template that the MIP intentionally should be able to bind subsequently.

In U.S. Pat. No. 5,110,833 "A method of producing synthetic enzymes or synthetic antibodies, comprising the orientation of monomers around a print molecule, addition of crosslinkers, polymerizing to a polymer and subsequent removal of the print molecule, thereby creating a cavity in the polymer corresponding to said print molecule" is claimed to increase specificity of the MIP towards the template molecule. In other words, the performance improvement claimed in U.S. Pat. No. 5,110,833 is based on optimizing the contact between the template molecule and monomer units prior to polymerization.

In U.S. Pat. No. 6,881,804, introduction of porosity in the MIP is described as a means to increase to performance of a MIP by increasing the access to the void that is intended to interact with the template.

In U.S. Pat. No. 6,638,498 specifically selected monomers are claimed for generation of bile acid specific MIP's and in US 2004/0157209 A1, it is suggested to immobilize the template molecule on a support material prior to polymerization. All of the suggestions to improve the performance of MIPs deal with the chemical characteristics of the monomers or the architecture of the MIPs, which are all process steps that take place prior or during the preparation of the MIP.

U.S. Pat. No. 5,994,110 discloses MIPs, which are produced in situ to form small polymers/oligomers, which include a structure complementary to a template molecule. The polymers or oligomers form a coating or image around the biomolecule, which coating or image is removed therefrom, and discrete entities are derived therefrom, which may be used, e.g., as therapeutic or prophylactic agents, i.e. drugs. Due to this type of production process, U.S. Pat. No. 5,994,110 does not utilise a micronization step as in conventional MIP particle preparation. U.S. Pat. No. 5,994,110 does suggest separation of MIPs from non-binders, but the methods suggested all rely on the very small size of the MIPs produced e.g., via chromatography but only when the MIPs are soluble entities. It is e.g. specifically indicated that therapeutically active MIPs according to U.S. Pat. No. 5,994,110 are those which exhibit molecular weights in the lower end of the 1-200 kDa range. Further, U.S. Pat. No. 5,994,110 does not disclose any means for separating suspended insoluble MIPs into "good binders" on the one hand and "less effective or non-binders" on the other.

US 2009/0194481 relates to a composite material obtainable by agglomerating previously prepared MIPs.

The present assignee has previously filed WO 2007/095949, which relates to preparation of MIP compositions having improved affinity for a template/target. In brief, the method entails subjecting insoluble MIPs prepared by traditional means including micronization as described above and then subsequently subjecting these to an affinity purification procedure, which is adapted to affinity purify insoluble material; useful technologies discussed in WO 2007/095949 are expanded bed adsorption and agglutination. This technology provides for MIP compositions where all or substantially all MIPs in the compositions bind the same target agent, since it was found that prior art insoluble MIP compositions includes large fractions of MIPs which binds only weakly or not at all to the intended target agent.

The present assignee has also previously filed WO 2011/033021, which relates to a purification scheme useful for multi-specific receptors such as MIPs—the method utilises at least 2 successive rounds of affinity purification where the capture agent in the affinity purification is coupled via different functionalities to a support in each of the at least two rounds. This technology ensures that only mulitispecific receptors that bind all relevant binding sites on the capture agent pass the entire purification process as the binding sites which may be "hidden" from interaction with the receptors during the first round of purification are exposed for binding to the receptors in the subsequent round(s). The technology in WO 2011/033021 has in particular been devised in order to allow preparation of MIPs that target amino acids such as phenylalanine.

OBJECT OF THE INVENTION

It is an object of embodiments of the invention to provide novel methods for the provision of insoluble MIPs, i.e. MIPs that can be separated from an aqueous solution by means of filtration and/or centrifugation. It is a further object of embodiments of the invention to provide methods for preparation of articles/devices composed of such insoluble MIPs, as well as to provide such articles/devices.

SUMMARY OF THE INVENTION

As detailed above, the traditional approach for preparing insoluble MIPs involves preparation of a highly crosslinked polymeric structure in the presence of template agents, followed by varying degrees of micronization of the crosslinked structure and subsequent removal of template in order to expose template-binding cavities to surrounding solvent. In order to obtain preparations of insoluble MIPs with high binding capacity and specificity, such a composition can be subjected to affinity purification such as expanded bed adsorption or agglutination as disclosed in WO 2007/095949.

It has now been found by the present inventors that a viable alternative to this technology is preparation of soluble MIPs followed by affinity purification of the soluble MIPs and finally coupling the soluble MIPs by means of a cross-linking reaction so as to yield MIPs that are insoluble as described herein.

It is known that nano sized particles (approx 50 nm) are useful in vivo for eliminating toxins in the blood stream (Hoshino et al (2008)). It is also known that nano sized particles can be separated or purified by affinity chromatography in a conventional chromatography setup in a packed bed mode as they are in the protein size range and behaves as if they were soluble (Piletsky et al (2006), Guerreiro et al (2009)).

If such nano sized MIPs are first purified by affinity chromatography and subsequently cross linked to form particles with a substantially larger size, e.g. 0.5-50 µm, which makes them insoluble, they would be useful for the same purposes as insoluble MIPs prepared by a more traditional approach.

So, in its broadest aspect the present invention relates to a method for preparation of insoluble molecular imprinted polymers (MIPs), the method comprising:
  a. providing soluble or semi-soluble MIPs that 1) substantially all bind template agents and 2) have sizes which enable their separation in a chromatographic step utilizing packed bed chromatography,
  b. cross-linking the template agent binding soluble MIPs provided in step a so as to obtain insoluble MIPs, and optionally isolating, concentrating or purifying the MIPs obtained in step b.

Several advantages are attained by this technology:

First of all, it is possible to prepare insoluble MIPs utilising any preparation protocol in step a, including those protocols described in the background section which aim at preparing soluble MIPs. So MIPs could be synthesized by precipitation polymerization or in situ hybridization (cf. below) in the required size and downsizing step could be simplified or avoided.

Second, the material obtained after step a is in a form which renders it suitable for purification by chromatography using packed bed chromatography, which may be more convenient than agglutination or expanded bed chromatography because of the availability of a large range of different chromatographic media and different column formats and also because conventional packed bed chromatography methods are less expensive, especially when applied in large scale.

Also, irrespective of the introduction of a purification step between steps a and b, the fact that soluble or semi-soluble MIPs are obtained in step a renders it possible to perform the subsequent cross-linking in step b under circumstances which enables shaping or casting the MIP derived product into any desired shape or form.

The smaller the particles, the larger the variation in binding capacity between the particles. I.e. very small particles are capable of being sorted to even higher capacity than larger particles. Going to the extreme, if MIPs produced by means of a traditional MIP preparation using micronization, then downsizing to a degree where the MIPs would have one or zero binding site, there would be a maximum difference between the different species in a sample of MIPs.

Further, conventional chromatography using a packed bed is much cheaper than expanded bed chromatography, especially when utilised in large scale.

If the method entails downsizing of MIPs prior to a purification step, the yield in the downsizing step will be much higher than when downsizing to e.g. 1-10 μm The washing step, where template is removed, would be easier to accomplish as very small (e.g. nano sized) particles could be washed by simple dialysis as access to the surface is increased.

When the MIPs are affinity purified as larger insoluble particles, e.g. >1 μm, it is as a rule assumed that the number and quality of binding sites pr polymer accessible from the outer surface is representative for the rest of the polymer particle. This assumption becomes increasingly closer to the truth as the MIP particles become smaller.

US 2009/0194481 provides for a method having some resemblance with the present approach. However US 2009/0194481 does not consider the quality of the starting material MIPs which enter into the agglomeration process (e.g. the cross-linking process) so the quality in terms of binding affinity of the composite material obtained by the process in US 2009/0194481 is at most as good as the binding affinity exhibited by the MIP starting material. The present invention provides for an improved starting material, and as detailed below also addresses the issue maintaining the affinity of the starting material MIPs.

DETAILED DISCLOSURE OF THE INVENTION

Definitions

A "molecular imprinted polymer" (MIP) is a polymer comprising cavities (or voids) that at least in part correspond to one or more template agents that have been incorporated in a monomer matrix including cross-linking monomers prior to polymerization. The resulting polymer after polymerization includes a number of cavities which correspond in shape to the template agent. Typically the MIP is sequestered into small particles, thereby facilitating removal of template and leaving partial cavities open for interaction with a target molecule which resembles or is identical to the template agent.

A "raw MIP" is a MIP prepared after cross-linking as part of a traditional MIP preparation process but which has not yet been subjected to any micronization and hence still incorporates template agents or at least debris derived from template agents in the cavities in the MIP structure.

"Crosslinking" in the present context denotes the process of multidirectional chain extension or branching of polymers leading to the formation of network structures. Crosslinking may result either through the polymerization of monomers with functionality greater than 2 (by condensation mode) or by covalent bonding between preformed polymer molecules accomplished by e.g. irradiation or miscellaneous chemical reactions. Crosslinking renders a polymer more resistant to heat, light, and other physical agencies, giving it a high degree of dimensional stability, mechanical strength, and chemical and solvent resistance. Cross-linking should not be confused with "grafting" of polymers, which is a technique for preparation of branched macromolecules in which the branches typically are of a different type from the polymer backbone and where the branches are only coupled via one single functionality. In contrast to cross-linking, grafting does not result in formation of fixed networks of polymers, that is, in a grafted polymer.

"Micronization" denotes the process of sequestering MIPs which may still contain template into smaller particles. Any method suitable for this purpose may be used.

A "target molecule" or "target agent" is in the present context any molecule/agent to which a MIP can specifically bind and is typically the molecule/agent to which it is intended that the purified MIPs should bind when ultimately using the MIPs for a purpose. The term "target molecule" is in the present context used interchangeably with the term "agent", when discussing binding of a MIP with such an "agent", but it is to be noted that the "agent" used in a purification step forming part of the method of the invention does not necessarily have to be identical to the target molecule rather, the agent is quite often a mimic or derivative of the target molecule which is useful for the purification steps discussed herein. The agent may e.g. constitute part of a larger molecule compared to the target molecule for instance, if the intended target molecule is an amino acid, also the corresponding amino acid residue forming part of a protein or peptide may be useful as an agent in a purification step. For example, the inventive process may include a purification process set up to enrich for MIPs that bind an amino acid residue, where one step in the purification employs a peptide where the amino acid is in the C-terminus, and where another step employs the amino acid in the N-terminus of a peptide—in such a case, the agent is the substance used in the purification steps, whereas the "target molecule" is considered to be the substance(s) which is/are effectively bound by the enriched MIPs. A target agent may also be constituted by several molecules—this is relevant if the target agent is a molecular complex such as may be the case if the target agent is a complex between a receptor and a ligand (in its broadest meaning, and thus also embracing a complex between an antibody and an antigen)—it is known that some complexes between receptors and ligands may attain a unique 3 dimensional structure so that the presence of the complex can be distinguished from the presence of unbound ligand or receptor if using MIPs, that specifically recognize the complex.

Likewise, a "template molecule" or "target agent" is normally identical to a target molecule/agent, but may also be a mimic or derivative thereof (i.e. a molecule having at least in part an identical 3D structure and profile which matches that of the target molecule—a mimic may for instance be constituted by a fragment of the target molecule). The template molecule/agent serves as the "generator" of the voids in the MIP structure which subsequently are to be able to bind the target molecule.

"Affinity purification" denotes any method for purification of a substance where specific binding between the substance and a binding partner is utilised. Many such methods utilise a capture agent bound to a solid support (such as a chromatographic matrix) which catches the substance. Typical examples known in the art are affinity purification using antibodies as capture agents coupled to chromatographic beads for purifying antigens that bind the antibody. It will be understood that the affinity purification methods applied according to the present invention are those which are capable of capturing suspended soluble MIPs discussed herein. Hence, a typical affinity purification method could be chromatography using a packed affinity column in e.g. HPLC (high performance liquid chromatography) or FPLC (fast protein liquid chromatography) or other such packed bed technologies known to a person skilled in the art.

A "solid phase" is in the present context any material which may be used to anchor a capture agent by means of covalent or non-covalent binding. Hence, any material (plastic polymers, sugars, metals, glass, silica, rubber etc) which is conventionally used in the preparation of chromatographic matrix materials may serve as the solid phase. The solid phase material may contain suitable functional groups which allow coupling of the capture agent to the material in question. Such derivatized materials are known to the person of skill in the art of chromatographic purification of proteins and other macromolecules. Further, the solid phase may have any physical form which allows for capture of relatively large and insoluble particles such as MIPs (when comparing with single biomolecules such as proteins). Hence, the solid phase may be in the form of fibers (preferably hollow), a chromatography matrix (preferably a matrix suitable for EBA), beads (preferably those that may be separated by electromagnetic means) or any other suitable form, cf. below.

The expression "soluble MIPs" refer to MIPs which are sufficiently small in size so as to allow their separation from a liquid vehicle by means of traditional chromatography methods utilising a packed bed of chromatographic matrix material. Typically, a soluble MIP will have a size and shape which allows it to be filtrated through a microporous material such as a membrane filter with a 450 nm cutoff. As detailed below, soluble MIPs of smaller sizes are also contemplated as starting materials for the present invention, and such soluble MIPs may be filtrated through a membrane filter with a cutoffs as small as e.g. 400 nm, 350 nm, 300 nm, 250 nm, 200 nm, 150 nm, 100 nm, 50 nm, and 10 nm.

The expression "insoluble MIPs" refer to MIPs which cannot in practice be purified by means of a traditional chromatography method utilising a packed bed of chromatographic matrix material. Typically, an insoluble MIP will be retained by a microporous material such as a membrane filter with a cutoff equal to or smaller than 900 nm. These MIPs are especially suitable as pharmaceutical for use in the gastrointestinal tract since their insolubility limits or prevents their passage into the body (e.g. into circulation) from the gastrointestinal tract. In other words, when administered orally, the insoluble MIPs used will substantially remain confined to the gastrointestinal tract until they are disposed of in the feces.

The expression "semi-soluble MIPs" denote MIPs which are retained by a microporous material such as a membrane filter with a 450 nm cutoff but which are filtrated through a microporous material such as a membrane filter with a 900 nm cutoff. Depending on the hydrophilicity of such semi-soluble MIPs, their behaviour in packed bed chromatography will vary. Preferred semi-soluble MIPs will be filtrated through membranes having a 800 nm cutoff, where more preferred semi-soluble MIPs will be filtrated through membranes having 700, 600, and 500 nm cutoffs, respectively.

Specific Embodiments of the Invention

To provide the soluble or semi-soluble MIPs in step a above may according to the invention be accomplished by any known method in the art, and the starting material soluble or semi-soluble MIPs may for instance be obtained from a commercial source. The essential feature of step a is that the MIPs provided are sufficiently small so as to render it possible to subsequently purify them via a step of traditional affinity chromatography using a packed bed with chromatographic matrix material, whereas the precise method of obtaining or generating the soluble or semi-soluble MIPs is of minor importance.

It will be understood that the present invention includes within its scope that the soluble or semi-soluble MIPs are provided by preparing, from a composition comprising at least one polymerizable agent in admixture with template agent, template agent binding soluble or semi-soluble MIPs—that is, in certain embodiments of the invention, the provision of the soluble or semi-soluble MIPs is achieved by a preparation step known per se.

For instance, the method generally disclosed in WO 2007/095949 where MIPs are prepared by conventional means and thereafter micronized to a desired small size, is useful. By utilizing this approach, the MIPs prepared may be sized down to any small size desired and separated, e.g. by filtration, from larger residual MIPs. Subsequently, the very small MIPs obtained may be subjected to conventional affinity purification schemes such as affinity chromatography using a traditional packed bed column. After eluting the MIPs the resulting fraction of MIPs will consist almost entirely of soluble or semi-soluble MIPs which all bind the template agent used in the initial phases of the MIP preparation.

Also, it is possible to prepare MIPs having the desired small sizes by utilizing any of the above-discussed methods for preparation of soluble MIPs. As examples, step a in the inventive process can entail preparation of MIPs by precipitation condensation (Hoshino et al (2008)) or by in situ polymerization (as disclosed in U.S. Pat. No. 5,994,110).

In preferred embodiments, the sizes of the soluble or semi-soluble MIPs prepared in step a are such that they will be filtrated through membrane filter having a 900 nm cutoff, since this normally ensures that the MIPs will be able to be separated using affinity chromatography in a packed bed column. However, smaller sized particles may be obtained, where the minimum size of the particles in general is governed by the size of the intended binding site in the ligands for the MIPs: the smaller the intended binding site, the smaller the MIPs, so the present invention contemplates the use of semi-soluble or soluble MIPs (cf. above) that will be filtrated through a membrane filter having a cutoff selected from 800 nm, 700, nm, 600 nm, 500 nm, 450 nm, 400 nm, 350 nm, 300 nm, 250 nm, 200 nm, 150 nm, 100 nm, 50 nm, and 10 nm.

In some embodiments of the method of the invention, the template agent binding MIPs substantially all bind the same template agent—that is, in this embodiment the soluble or semi-soluble MIPs provided in step a are generated in one or more polymerization processes in the presence of the same template molecule/agent.

Alternatively, the template agent binding MIPs bind at least two different template agents—that is, in this embodiment the soluble or semi-soluble MIPs provided in step a are generated in a process including several template molecules/agents or the soluble or semi-soluble MIPs in step a are constituted by a mixture of MIPs that have been generated against several different template molecules/agents.

It is advantageous if the polymerizable agent(s) used to prepare the soluble or semi-soluble MIPs in step a include(s)

optionally protected functional groups, wherein the functional groups, if protected, are deprotected after preparing the soluble or semi-soluble MIPs in step a but prior to step b. This approach facilitates the subsequent cross-linking in step b, which advantageously involves the functional groups of the soluble or semi-soluble MIPs.

Optional Purification after Step a

All the embodiments described herein may, if necessary, include an affinity purification step in order to ensure that the soluble or semi-soluble MIPs all bind template agents—this is e.g. of relevance if the soluble or semi-soluble MIPs in step a are obtained from a commercial source and are not all binders of template/target, or if the method for their preparation does not in itself ensure that all the MIPs bind template. So, in this embodiment, step a, after provision of the soluble or insoluble MIPs, entail at least one affinity purification step using template agent or target agent or a mimic thereof as affinity purification agent, so as to enrich for soluble MIPs having affinity for said template, target or mimic thereof.

The goal of the purification step is to perform the cross-linking in step using a starting material substantially exclusively constituted by MIPs that bind template/target so as to avoid inclusion of non-binding or weakly binding MIPs.

In the above described embodiments where the soluble or semi-soluble MIPs provided in step a bind a plurality of template agents, the affinity purification can be constituted by a step where capture agents corresponding to all relevant MIP binding template/target agents are used as capture agents in a one-step purification, or, alternatively where the affinity purification is performed in serial steps (using one capture agent in each step), where eluted fractions that do not contain the MIPs captured in previous steps are subjected to subsequent steps to capture those MIPs that bind the other capture agent(s)—these serial steps are then followed by pooling the MIPs captured in each of the purification steps. Both these approaches ultimately provide for a mixture of MIPs that all bind target, and where the mixture binds more than one target.

A more simple way to ensure that only template binding MIPs are used as starting point in step b is to provide a plurality of collections of MIPs, where each MIP collection is constituted by MIPs that bind the same template/target—that is, single target MIPs are obtained/prepared in conventional ways and optionally enriched for and subsequently the single target MIPs are pooled prior to exercising step b. So, in this embodiment, a series of parallel provisions of soluble and semi-soluble MIPs are performed, the MIPs are combined, whereafter the combined MIPs are cross-linked in step b.

In a particular embodiment any of the affinity purification method detailed above may comprise at least two subsequent rounds of affinity purification wherein the affinity purification agent used in each round is immobilized to a chromatographic matrix via a functional group not used in any other of the at least two rounds of affinity purification.

This particular embodiment thus utilises the technology disclosed in WO 2011/033021, which has as an outcome that each of the soluble or semi-soluble MIPs enriched for are capable of binding more than one discrete effective binding site on its respective template/target. So, the present invention involves use in step a of a method for preparing a composition enriched for soluble or semi-soluble MIPs that bind an agent, where said MIPs each specifically bind at least two discrete sites on said agent, the method comprising
i) providing a sample comprising said MIPs,
ii) subjecting said sample to a first step of affinity chromatography, where said agent is used as affinity purification agent, and wherein said agent is immobilised to a solid or semi-solid phase via binding to one single of said at least two discrete sites,
iii) recovering receptors binding to the agent,
iv) subjecting MIPs recovered in the previous step to at least one further step of affinity chromatography, where said agent is used as affinity purification agent, and wherein said agent is immobilised to a solid or semi-solid phase via binding to another of said at least two discrete sites, and recovering MIPs binding to the agent,
wherein, in each said at least one further step of affinity chromatography, said another of said at least two discrete sites is different from any one of said at least two discrete sites, which has been used previously in steps b and d for immobilization of the agent to a solid or semi-solid phase.

Details relating to this embodiment are described in WO 2011/033021 which is hereby incorporated by reference in its entirety.

As discussed herein, it is especially preferred that the affinity purification step utilises a packed bed chromatographic matrix. However, EBA could be used to purify the soluble or semi-soluble MIPs from a crude sample containing soluble, semi-soluble and in-soluble particles.

In general, the choice of template agents and affinity purification agents depends on the exact intended end use of the insoluble MIPs prepared for MIPs used in analytical applications, any ligand of choice may constitute the template agent or the mimic thereof.

Especially preferred template molecules/agents and target molecules/agents are described in WO 2011/033021 and in WO 2007/095949 and all disclosure in these 2 references in terms of template and target molecules as well as mimics thereof apply mutatis mutandis to the present invention. Examples of target molecules/agents or templates are:

a: A chemical substance having the formula $H_3N^+$—CH(R)—$COO^-$, such as an amino acid, or the agent may be a peptide having at most 12 amino acid residues, such as 2, 3, 4, 5, 6, 7, 8, 9, 10, or 11 amino acids. The amino acid is typically selected from phenylalanine, tyrosine, histidine, leucine, methionine, isoleucine, tryptophan, threonine, valine and lysine. Also, the peptide is typically one, which includes within its sequence at least one amino acid selected from the group consisting of phenylalanine, tyrosine, histidine, leucine, methionine, isoleucine, tryptophan, threonine, valine and lysine. In particular embodiments, these amino acids appear as the N-terminal and/or C-terminal amino acid in the peptide. In the embodiments where the agent is a peptide, it is typically a dipeptide, a tripeptide, a tetrapeptide or a pentapeptide.

b: A carbohydrate, such as a branched or linear oligosaccharide having a maximum of 10 monosaccharide units. In certain embodiments, the carbohydrate is thus selected from a monosaccharide, a disaccharide, and a trisaccharide. Particularly interesting carbohydrates are D-galactose and lactose.

c: A fatty acid or a lipid; in the event the agent is a lipid, it is typically selected from the group consisting of cholesterol, a triglyceride, and a bile acid or a salt thereof.

d: An oligonucleotide or an oligonucleotide derivative, such as an oligonucleotide or oligonucleotide derivative selected from the group consisting of an RNA oligonucleotide, a DNA oligonucleotide, an LNA oligonucleotide, a PNA oligonucleotide, and a mixed oligonucleotide. In certain embodiments, the oligonucleotide or oligonucleotide deriveative is a mixed oligonucleotide, which comprises at least one ribo- or deoxoribunucleotide unit and at least one LNA or PNA nucleotide unit.

e: any molecules which are combinations of target templates a-d (that is, molecules that include a component from at least 2 of groups a-d; examples are lipo- or glycopeptides.

Cross-Linking in Step b

Different strategies could be envisaged for the cross linking of the soluble or semi-soluble MIPs.

In general, the methods for agglomerating MIPs disclosed in US 2009/0194481 are all useful in step b of the present invention. US 2009/0194481 is hence incorporated by reference, in particular insofar as the disclosure therein relates to cross-linking for combining small MIPs into larger structures.

A functional group is preferably available on the particle before the cross linking can take place. The functional group could be incorporated into the polymer or grafted on the polymer after polymerization (and downsizing if that strategy is used). The functional groups could be incorporated in the polymer or grafted to the polymer as either protected or unprotected functional groups.

The functional group could be selected from the group consisting of $—NH_2$, $—NRH$, $—NR_2$, $—N^+R_3$, $—OH$, $—SH$, $—COOH$, $—CHCH_2$, $—NCO$, $—NCS$, X (i.e. halogen and halide derivatives) and active derivatives hereof such as ester, acid halide, anhydride, amides (primary and secondary), sulphonamides, and amidines. As an alternative to introducing a functional group specifically for purpose of the cross linking, a functional group on one of the functional monomers or a reactive derivative of a functional group already included in the MIP as a functional monomer could be prepared after the soluble or semi-soluble MIP has been produced. One example is that COOH e.g. from methacrylic acid—a functional monomer very often used in MIPs synthesis—could be transformed into an active N-hydroxysuccinmide ester and subsequently a compound comprising 2 or more amino groups could be used as cross linker. Another example would be if beta-cyclodextrin was used as functional monomer in the MIP: in that case the hydroxyl groups on the beta-cyclodextrin could be used as handles for cross linking using e.g. divinyl sulfone as a cross linker.

To a solution of the soluble or semi-soluble MIPs, a cross linking reagent is added. The cross linking reagent can be either di, tri or multivalent and should have functional groups that can react with the functional groups in the soluble or semi-soluble MIP particles and the reaction conditions such as solvent, pH, temperature etc should facilitate the reaction. The reaction should continue until cross-linked particles of the desired/required size have been obtained. This could be controlled by parameters such as concentration of soluble MIP, concentration of cross linking reagent, the concentration ratio between MIPs, and cross linking reagent, addition of reaction quenching substances, change in temperature, dilution of the reaction mixture, etc.

A preferred size range for the insoluble MIPs obtained is 0.5-50 μm to prevent particles to be absorbed from the gastrointestinal tract if the cross linked particles were used for therapeutic treatment in a non-systemic mode of action.

Alternatively, the cross-linking in step b is performed as described above in a mould or in the presence of a scaffold so as to cast the MIPs obtained into a desired shape—in this embodiment, the sizes of the MIPs obtained may be much larger than 50 μm, since such a cross-linked polymer may have sizes that even allow manual handling of the MIP structure. For instance, the MIPs could be casted into the shape of a sponge, a net, a fibrous material, a filter, a fiber, which would enable MIP devices useful in large scale operation (e.g. or waste water purification) or MIP devices in the form of functionalized surfaces (such as microtiter plates or the like).

During the cross-linking reaction it is preferred that the cross-linking does not involve template binding areas of the MIPs. For instance, step b may entail that the template binding areas on the MIPs are blocked by template molecule/agent or a mimic thereof during the cross-linking process, i.e. the ligand-specific binding site could e.g. be protected by having the templage or ligand, or a derivative, mimic or analogue thereof, present in the solution while the cross linking takes place. This approach would protect binding sites in the individual soluble MIP particle from being sterically hindered in subsequent (post cross linking) rebinding of the ligand. For instance, if a insufficient amount of ligand is used in the reaction as a protection agent against cross-linking, there will be an inherent selection for preservation of the superior binding sites after completion of cross-linking.

Optional Isolation in Step c

The last step in the process of the invention entails an optional purification or isolation of the insoluble MIPs produced. Any method known in the art may be utilised, such as for instance centrifugation, filtration, dialysis etc. In the event the cross-linking method employed has not ensured that all the MIPs produced are actual binders of target/template, it is also possible to employ affinity purification methods such as those described in WO 2007/095949—that is, EBA or agglutination may be utilised in this step. However, due to the advantages involved when preparing insoluble MIPs where the binding sites or binding pockets are protected from the cross-linking process in step b, the most preferred embodiments of the invention rely on the more rapid and simple methods such as centrifugation or filtration.

Uses of MIPs Prepared According to the Present Invention

The present invention also relates to a method for treatment, amelioration or prophylaxis of a disease selected from the group consisting of phenylketonuria (PKU, Følling's disease), hyperphenylalaninemia (HPA), alcaptonuria (black urine disease), tyrosinemia, hypertyrosinemia, myasthenia gravis, histidinemia, urocanic aciduria, maple syrup urine disease (MSUD), isovaleric acidemia (isovaleryl-CoA dehydrogenase deficiency), homocystinuria, propionic acidemia, methylmalonic acidemia, glutaric aciduria Type 1 (GA-1), and galactosemia, comprising administering to the gastrointestinal tract of a patient in need thereof an effective amount of a composition of molecular imprinted polymers (MIPs) which are prepared according to the present invention and said composition being capable of binding a symptom provoking agent of said disease and said MIPs being prepared as disclosed in the present invention—in this context, reference is made to the disclosure in WO 2011/033021, where details are provided concerning these diseases and relevant symptom provoking agents. Related to this aspect is a composition of MIPs prepared according to the present invention for use in such a method.

Alternatively, the disease is hypercholesterolaemia. Here is referred to the disclosure in both WO 2011/033021 and in WO 2007/095949, where the relevant targets for the MIPs are detailed.

MIPs and MIP Compositions of the Invention

The present invention also relates to novel MIPs and novel compositions of MIPs. MIPs obtainable by the methods of the present invention are structurally distinct from insoluble MIPs which are obtained by traditional methods due to the technologies used to cross-link the individual MIPs—among other things, the choice of a cross-linking functionality, which provides unique attachment points between the originally insoluble MIPs. In particular, when using cross-linking conditions which aim at avoiding cross-linking in the template binding site of the MIPs, cf. above, the physical structure of each cross-linked MIP will be distinguishable over known insoluble MIPs.

Example of Purification before Cross-linking

Polymer was synthesized with L-phenylalanine as target and subsequently down-sized to soluble particles by mechanical grading and ball-milling followed by centrifugation. To remove target molecules and other impurities from this soluble MIPs fraction the sample was extensively dialyzed against PBS. The sample was thereafter applied to a conventional packed bed chromatography column. The column matrix was an N-hydroxysuccinimidyl (NHS) activated sepharose 4 FF (GE Lifescience, 17-0906-01) to which the peptide Gly-(L)Phe had been coupled prior to the purification. The column bed size was approx 30 ml, and flow rate was 1 ml/min. The chromatography was followed online at 210 nm. A large run-through peak was seen at approx 9-20 min after injection. The MIPs that bound to the column were eluted off the column by applying 1 ml phenylalanine, 10 mg/ml in running buffer, at 70 min. A small peak (approx 1-2% in size compared to the run-through peak) at 78-83 min was collected and dialyzed extensively against PBS to remove Phe from the eluted fraction. At 94-102 min a very large peak containing Phe was eluted. Finally, this eluted MIPs sample was tested for Phe binding capacity and compared against the starting material. This Phe binding capacity test was performed by adding Phe spiked with $^3$H-labeled Phe to a MIPs sample and MIPs-bound Phe was separated from unbound Phe by passing the sample through a size exclusion chromatography column (GE Lifescience 28-9180-04) and finally counted in a scintillation counter after mixing with scintillation fluid. The MIPs in the 78-83 min peak showed Phe binding capacity more than 500 times higher than the unpurified MIPs.

LIST OF REFERENCES

1) Yu Cong, Ph.D-thesis: "Molecular Recognition Studies Based on Imprinting Technology", Dept. of Pure and Applied Biochemistry, University of Lund, Sweden 1998.
2) Leif Schweitz, Ph.D-thesis: "Molecular Imprinted Matrices for Electrochromotography", Technical Analytical Chemistry, University of Lund, Sweden 2001.
3) Ioana Wärnmark-Surugiu, Ph.D-thesis: "Antibodies and Antibody Mimics in Binding Assays", Dept. of Pure and Applied Biochemistry, University of Lund, Sweden 2002.
4) Dickey F H, "The preparation of specific absorbents" Proc. Natl. Acad. Sci. 35(1949)227-229.
5) Ramström O et al J. Mol. Recog. 9(1996)691-696
6) Schweitz L et al J Chromatog. A 792(1997)401-409
7) Vlatakis G et al "Drug Assay Using Antibody Mimics Made by Molecular Imprinting" Nature 361(1993)645-647
8) Funke, W. et al, Adv. Polym. Sci. 136(1998) 139-243
9) Shea K J and Dogherty T K, J. Am. Chem. Soc. 108(1986) 1091-1093
10) Shea K J, Stoddard G J, Shavelle D M, Wakui F and Choate R M Macromolecules 23(1990)4497-4507
11) Wulff G and Poll H G Makromol. Chem. 188(1987)741-748
12) Hoshino et al (2008), JACS 130; 15242-3
13) Hoshino et al (2010), JACS 132; 6644-5
14) Piletsky et al (2006), Biopolymers and Cell 22; 63-67
15) Guerreiro et al (2009), Biosensors and Bioelectronics 24; 2740-2743

The invention claimed is:

1. A method for preparation of insoluble molecular imprinted polymers (MIPs), the method comprising:
    a. providing soluble or semi-soluble MIPs that 1) substantially all bind template agents and 2) have sizes which enable their separation in a chromatographic step utilizing packed bed chromatography and such that the will be filtrated through a membrane filter having a 900 nm cutoff,
    b. cross-linking the template agent binding soluble MIPs provided in step a so as to obtain insoluble template agent binding MIPs, and
    c. optionally isolating, concentrating or purifying the MIPs produced by the cross-linking in step b.
2. The method according to claim 1, wherein the sizes of the soluble or semi-soluble MIPs provided in step a are such that they will be filtrated through a membrane filter having a 450 nm cutoff.
3. The method according to claim 1, wherein the soluble or semi-soluble MIPs are provided by preparing, from a composition comprising at least one polymerizable agent in admixture with template agent, template agent binding soluble or semi-soluble MIPs.
4. The method according to claim 3, wherein the soluble or semi-soluble MIPs in step a are prepared from a method selected from 1) MIP preparation by polymerization into larger particle sizes followed by micronization, 2) MIP preparation by polymerization condensation, and 3) MIP preparation by in situ polymerization.
5. The method according to claim 3, wherein the template agent binding MIPs substantially all bind the same template agent.
6. The method according to claim 3, wherein the template agent binding MIPs bind at least two different template agents.
7. The method according to claim 1, wherein the polymerizable agent(s) used to prepare the soluble or semi-soluble MIPs in step a include(s) optionally protected functional groups, and wherein the functional groups, if protected, are deprotected after preparing the soluble or semi-soluble MIPs in step a but prior to step b.
8. The method according to claim 7, wherein the cross-linking in step b involves the functional groups of the soluble or semi-soluble MIPs.
9. The method according to claim 1, wherein the cross-linking in step b does not involve cross-linking of template agent binding areas of the MIPs.
10. The method according to claim 9, wherein step b entails that the template agent binding areas on the MIPs are blocked by template agent or a mimic thereof during the cross-linking process.
11. The method according to claim 1, wherein step a, after provision of the soluble or insoluble MIPs, entails at least one affinity purification step, where each step employs template agent or target agent or a mimic thereof as affinity purification agent, so as to enrich for soluble MIPs having affinity for said template agent, target agent, or mimic thereof.
12. The method according to claim 11, wherein said affinity purification step comprises at least two subsequent rounds of affinity purification wherein the affinity purification agent used in each round is immobilized to a chromatographic matrix via a functional group not used in any other of the at least two rounds of affinity purification.
13. The method according to claim 11, wherein the affinity purification step utilizes a packed bed chromatographic matrix.

14. The method according to claim 1, wherein the cross-linking in step b is performed in a mold or in the presence of a scaffold so as to cast the MIPs obtained into a desired shape.

15. The method according to claim 14, wherein the MIPs are cast into the shape of a sponge, a net, a fibrous material, a filter, or a fiber.

\* \* \* \* \*